United States Patent

Bishop

[11] Patent Number: 5,840,274
[45] Date of Patent: Nov. 24, 1998

[54] DEFLATION RESISTANT TIRE AND INSERT APPARATUS

[75] Inventor: Thomas R. Bishop, 1423-B N. Broadway, Escondido, Calif. 92026

[73] Assignee: Thomas R. Bishop, Diamond Bar, Calif.

[21] Appl. No.: 556,320

[22] Filed: Nov. 13, 1995

[51] Int. Cl.$^6$ ..................................................... B60C 7/12
[52] U.S. Cl. .................. 152/157; 152/310; 152/312; 152/322
[58] Field of Search ..................................... 152/310, 311, 152/312, 313, 314, 318, 322, 315, 157, 158

[56] References Cited

U.S. PATENT DOCUMENTS

| | | | |
|---|---|---|---|
| 1,009,752 | 11/1911 | Huebner | 152/313 |
| 1,067,639 | 7/1913 | Budd | 152/318 |
| 1,070,183 | 8/1913 | Rucker | 152/314 |
| 1,339,472 | 5/1920 | Needham | 152/318 |
| 1,362,731 | 12/1920 | Nagel | 152/318 |
| 1,725,882 | 8/1929 | Prigge | 152/318 |
| 2,142,962 | 1/1939 | Conklin | 152/322 |

Primary Examiner—Geoffrey L. Knable

[57] ABSTRACT

In a tire inflation insert of the present invention, a tire casing contains a ring having a plurality of air filled spaces or pockets. The tire inflation insert comprises a roll of a flexible sheet, wrapped with a securing belt of material such as tape, which is formed into a ring for insertion into the tire casing. The flexible sheet comprises rubber or plastic sheeting or other flexible material having a plurality of air pockets therein although flexible foam material may also be used. In some cases non-resilient foam may be introduced into the tire casing in the form of a liquid mixture which chemically reacts to form a non-resilient foam and fills the entire cavity thereof. Such non-resilient foam is currently used in packaging materials where chemicals are mixed as they are introduced to the cavity and the chemical reaction causes foam to form within the cavity forcing air out of any cavity and completely filling the same with foam having a plurality of cavities. In addition, a flexible sheet similar to that used to protect products during shipping may be used or other matting which is formed by the process of pressing two sheets of rubber, plastic or other flexible material together using heat and forced air to form one sheet of a flexible sheet containing compressed air bubbles. Any suitable process for creating a flexible sheet, however, can be used.

7 Claims, 1 Drawing Sheet

DEFLATION RESISTANT TIRE AND INSERT APPARATUS

FIELD OF INVENTION

This invention relates to puncture proof tires, specifically to a flexible sheet tube tire.

BACKGROUND OF INVENTION

Conventional tires comprise a tire casing containing a tube or are of the tubeless variety. In either case the tire is inflated by air which is pumped into the tube through a valve until the desired pressure is achieved. In the related art, resistance to puncture of the tube is provided by the tire casing and in some cases inner coatings of sealant material. When the casing of tires currently in use is punctured, the wall of tire and often the inner tube also may be punctured causing air to escape and the tire to go flat. Other systems which self seal the tire are limited to minor punctures and cannot seal severe punctures or blowouts.

It is therefore an object of this invention to provide a tire which resists deflation due to punctures.

It is an object of this invention to provide a tire which resists deflation due to severed punctures and blowouts.

It is a further object of this invention to provide a simplified insert which can be easily assembled and inserted into a tire to resist deflation.

BRIEF DESCRIPTION OF THE INVENTION

The tire inflation insert of the present invention comprises a ring of material having a plurality of air filled spaces or pockets. A tire casing is provided with a roll of a flexible sheet of material, wrapped with a securing belt of material such as tape, which is formed into a ring for insertion into the tire casing. The flexible sheet of material comprises rubber or plastic sheeting or other or combination of each of the foregoing formed into a flexible material having a plurality of air pockets therein although flexible foam material may also be used. In some cases non-resilient foam may be introduced into the tire casing in the form of a liquid mixture which chemically reacts to form a non-resilient foam and fills the entire cavity thereof. Such non-resilient foam is currently used in packaging materials where chemicals are mixed as they are introduced to the cavity and the chemical reaction causes foam to form within the cavity forcing air out of any cavity and completely filling the same with foam having a plurality of cavities. In addition, a flexible sheet similar to that used to protect products during shipping may be used or other matting which is formed by the process of pressing two sheets of rubber, plastic or other flexible material together using heat and forced air to form one sheet of a flexible sheet containing compressed air bubbles. Any suitable process for creating a flexible sheet, however, can be used. It is important that the strength of such matting be sufficient to withstand the compression forces which are exerted by the vehicle and therefore while the thickness of the sheet of a flexible sheet after formation may vary but is ideally about ¼ inch or greater. The width and the length of the sheet of a flexible sheet must be of a suitable dimension for constructing a ring for insertion into a specific tire casing such that the ring is closed about the circumference of the tire. The larger the casing the greater the dimensions. The outer circumference of the ring and its circumference should generally be as follows: the width is roughly equal to the outer circumference of the tube of the ring and the length should be of at least sufficient dimension such that when the flexible sheet tube is formed into a cylinder and the opposing ends of said cylinder are brought in conjunction when inserted into the tire casing.

The ring is rolled and disposed with opposite ends in communication with each other and bonded by heat sealing. Any suitable means for connecting the opposite ends may be used.

When the tire includes the ring described above, damage to the tire cannot deflate the tire completely. Even severe damage cannot deflate the tire completely because puncture damage is localized and would damage or penetrate only local air bubbles.

DETAILED DESCRIPTION OF THE INVENTION

Figure 1:
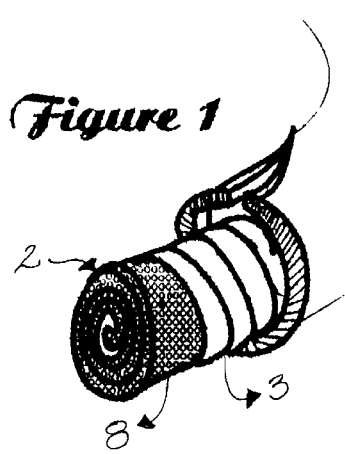
FIG. 1 is a cut away view of a portion of the tire casing containing a ring of rolled a flexible sheet wrapped in tape.

FIG. 1 of the drawings shows the preferred embodiment of the present invention, in cut away view. In the preferred embodiment, a tire casing (1) contains a ring (8) of rolled a flexible sheet (2) wrapped with tape (3). It is to be understood by those skilled in the art that the use of a flexible wrap, belt or tape (3) is not necessary to the object of the present invention. The tire casing (1) is comprised of rubber or any other suitable material having suitable strength and abrasive resistance for use as a tire casing. The flexible sheet (2) is comprised of rubber or plastic sheeting or other material having suitable permeability and strength characteristics for use within a tire casing. The flexible wrap, belt or tape (3) is comprised of rubber, plastic, at least part rubber at least part plastic or other material having suitable strength characteristics sufficient to bind said flexible sheet as hereinafter described.

Figure 2:
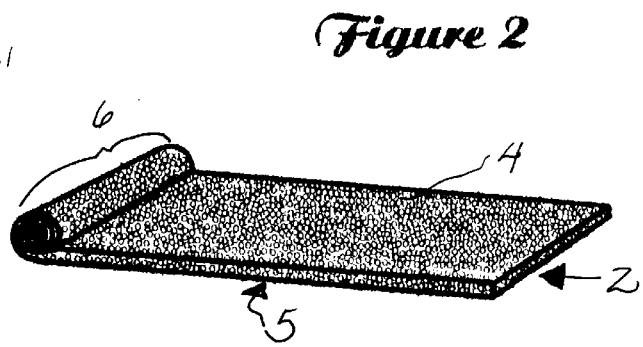
FIG. 2 is an isometric view of a flexible sheet partially rolled.
Figure 3:
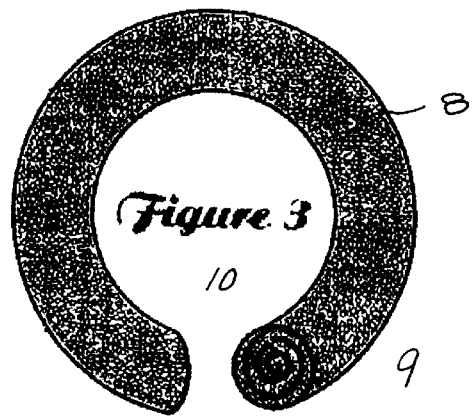
FIG. 3 is an isometric view of a ring of rolled air matting.

FIG. 2 of the drawings shows a sheet of a flexible sheet (2) partially rolled. In the preferred embodiment the flexible sheet (2) is formed by the process, know to the art, of pressing two sheets of rubber, plastic or other suitable material together using heat and forced air to form one sheet of a flexible sheet (2) containing compressed air bubbles (4). Any suitable process for creating a flexible sheet, however, can be used. The thickness (5) of the sheet of a flexible sheet (2) should be roughly ¼ inch or greater. The width (6) and the length of the sheet of a flexible sheet (2) are of any suitable dimension for constructing a ring (FIGS. 3, 8) with the desired outer circumference (FIGS. 3, 9) and inner circumference (FIGS. 3, 10). The width (6) is at least roughly equal to the outer circumference (FIGS. 3, 9) of the ring (FIGS. 3, 8). The length (7) should be of at least sufficient dimension that when the flexible sheet is rolled to form a cylinder and the opposing ends of said cylinder are brought in conjunction, a ring with the desired inner circumference (FIGS. 3, 10) and outer circumference (FIGS. 3, 9) is formed.

FIG. 3 of the drawings shows a ring (8) comprised of a flexible sheet (2). The ring (8) has an outer circumference (9) and an inner circumference (10). In the preferred embodiment, the ring (8) is made from a flexible sheet rolled and disposed with opposite ends in communication with each other and bonded by heat sealing. Any suitable means for disposing the opposite ends in communication with each other, however, may be used.

Figure 4:
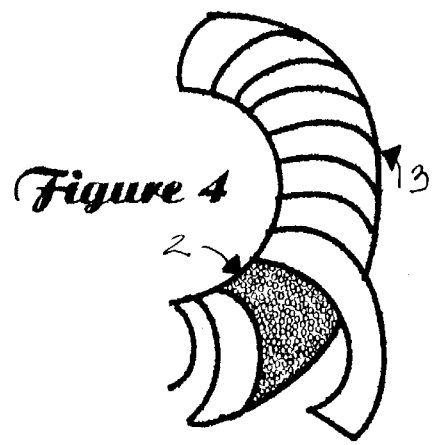
FIG. 4 is an isometric view of a ring of rolled air matting wrapped in tape.

FIG. 4 of the drawings shows a ring (8) of a flexible sheet (2) wrapped in a belt of tape (3) to seal the ring (8). In the preferred embodiment, the ring (8) of a flexible sheet (2) wrapped in tape (3) is placed in a tire casing (FIG. 1, 1) of suitable size to comprise a tire.

Although the invention has been described by reference to the preferred embodiment, it is to be understood by those skilled in the art that the invention is not limited thereto, and that other implementations thereof within the scope of the invention will be apparent to those skilled in the art. Having thus described the invention,

What is claimed is:

1. A tire comprising a casing containing a ring made from flexible laminated plastic sheets, having a plurality of gas filled spaces therebetween, rolled into a generally cylindrical shape and disposed in a ring configuration, with opposite ends of said cylinder disposed in juxtaposition to each other.

2. A tire as described in claim 1 wherein: said ring is wrapped with a securing material adapted to maintain said sheet in a rolled configuration.

3. A tire as described in claim 2 wherein: said ring is wrapped with tape.

4. A tire as described in claim 2 wherein: said ring is wrapped with tape comprised at least partially of rubber.

5. A tire as described in claim 2 wherein: said ring is wrapped with tape comprised at least partially of plastic.

6. A puncture proof tire comprising: a tire casing containing a ring made from laminated plastic sheets having a plurality of gas or air filled spaces therebetween rolled and disposed with opposite ends heat sealed together in a circular configuration, said ring being wrapped with rubber tape.

7. A tire as described in claim 6 wherein the laminated plastic sheets have a thickness of about ¼ inch.

* * * * *